United States Patent Office 2,828,597
Patented Apr. 1, 1958

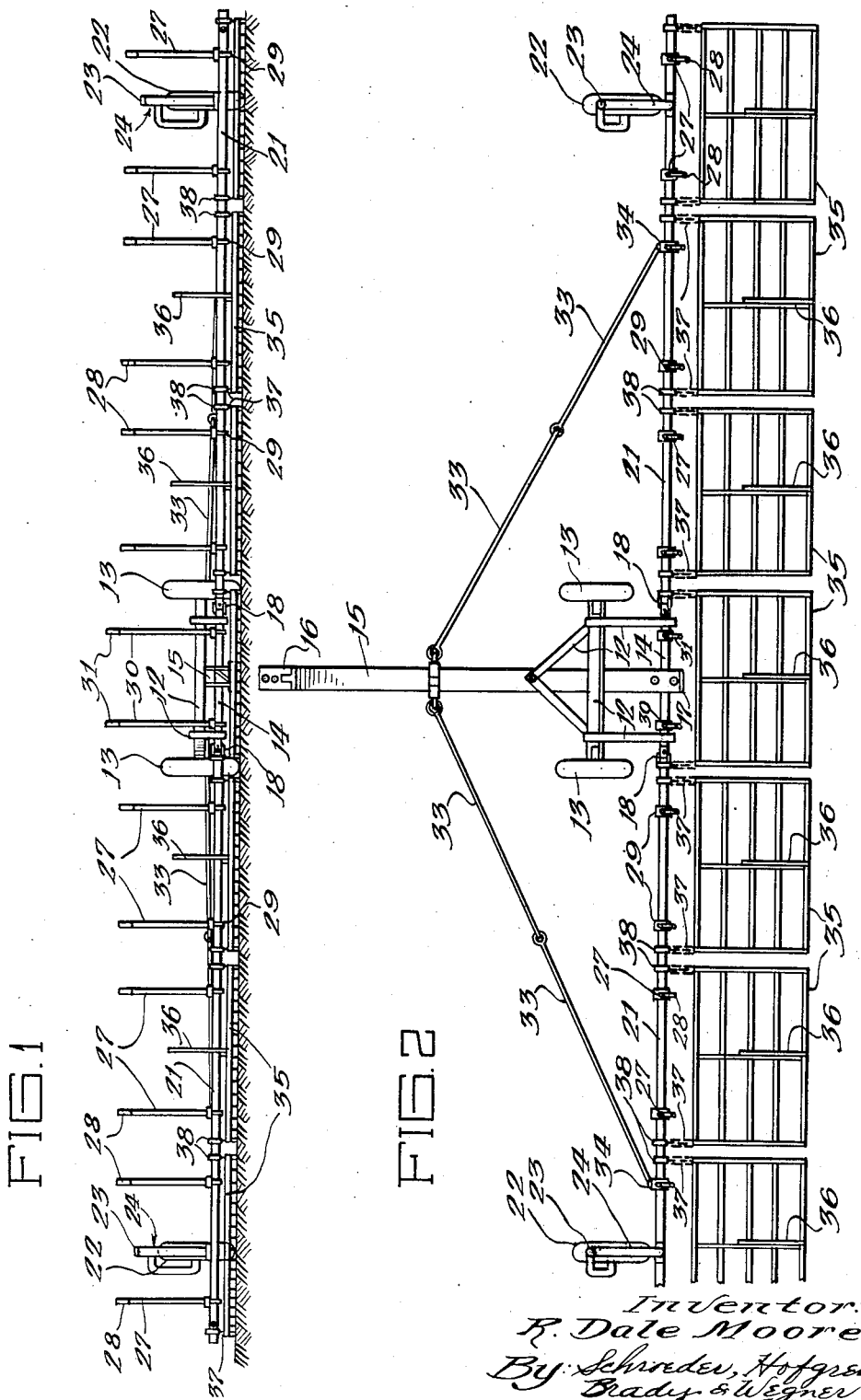

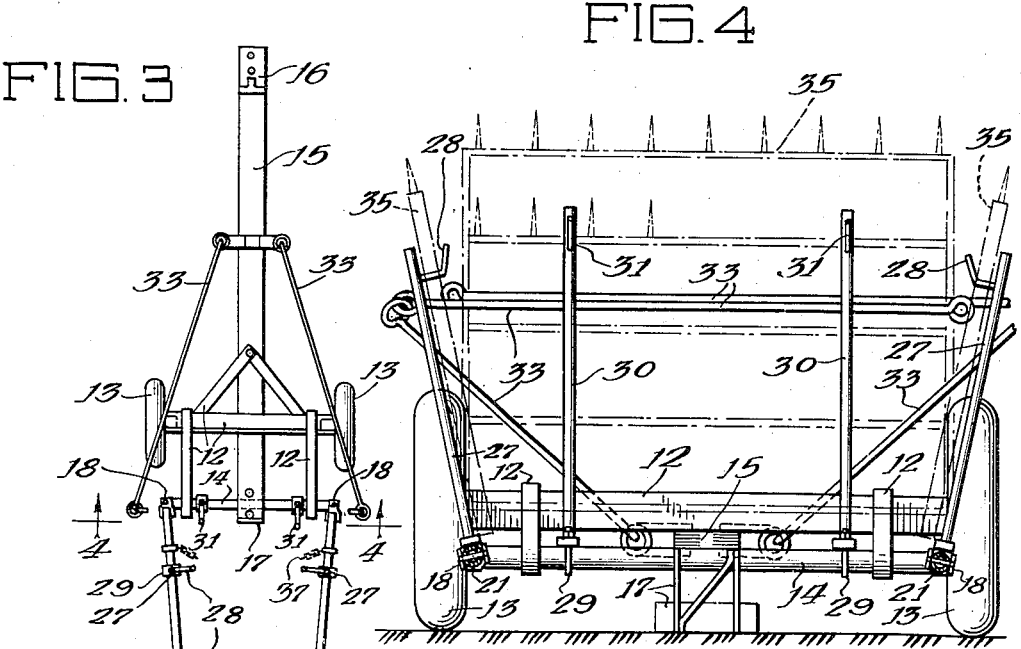

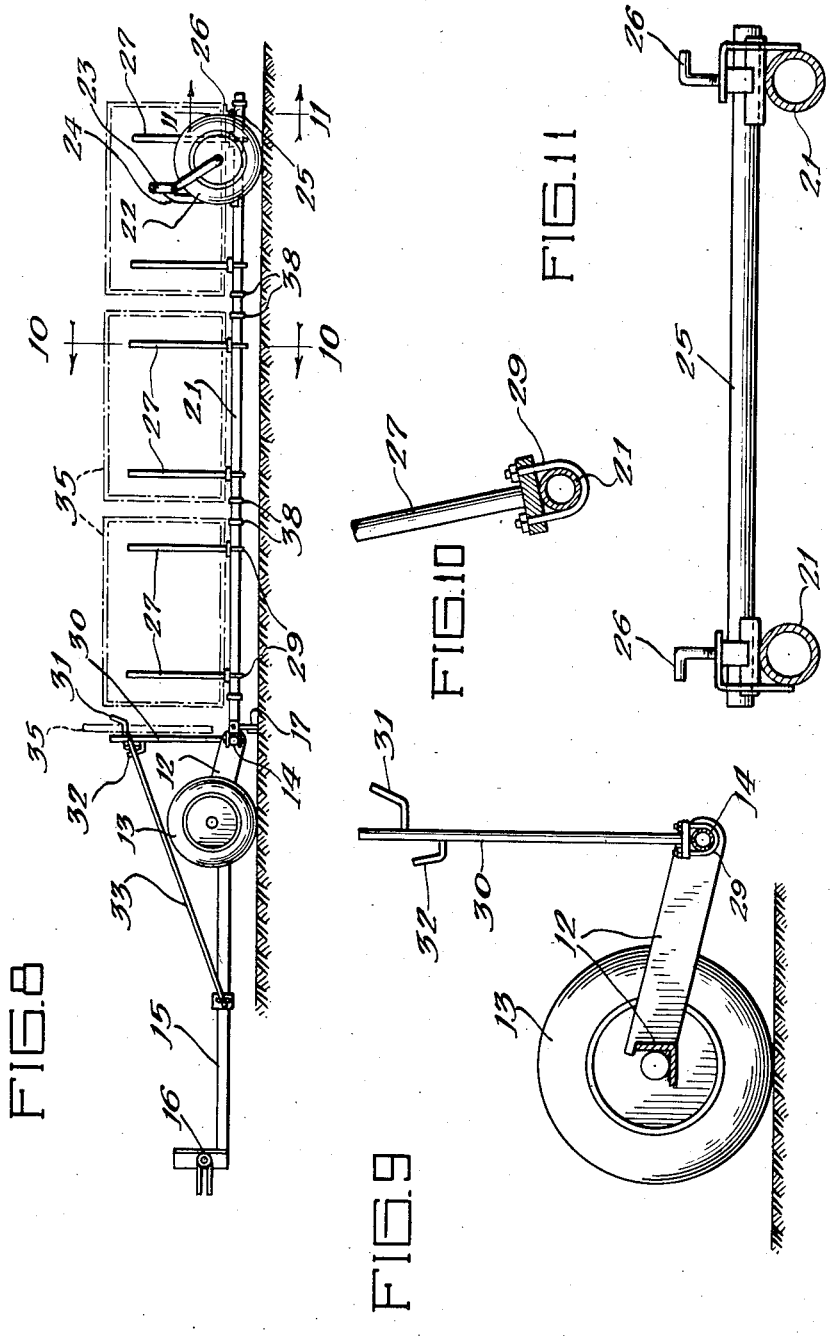

2,828,597

SPIKE-TOOTH HARROW EVENER

Raymon Dale Moore, Kewanee, Ill., assignor to Kewanee Machinery & Conveyor Company, a corporation of Illinois Application December 3, 1954, Serial No. 472,864

4 Claims. (Cl. 55—89)

This invention relates to a farm implement for pulling a plurality of sections of spike-tooth harrows in proper relation to harrow a wide swath by each trip of the tractor across a field.

The primary object of the invention is to provide a wheel mounted device which will conveniently and compactly carry a plurality of harrow sections from the farmyard to the field and may be readily transformed into a working unit with a minimum of effort and time.

A further object of the invention is to provide a cross beam with a pair of hinged extensions on which are mounted standards with hooks for supporting the harrow sections in transport position. Another object of the invention is to provide caster wheels which properly support the free ends of the cross beam extensions in both working and transport position. Another object of the invention is to provide special hinges having their pintles arranged to hold the extensions in proper relation with respect to the caster wheels so that the ends of the extensions will not drag on the ground in either working or transport position.

The invention is illustrated in a preferred embodiment in the accompanying drawings in which:

Fig. 1 is a rear elevational view of the machine with seven harrow sections attached in working position;

Fig. 2, a fragmentary plan view of the device shown in Fig. 1;

Fig. 3, a plan view of the machine in transport position but with the harrow sections removed;

Fig. 4, a rear sectional view taken as indicated at line 4—4 of Fig. 3;

Fig. 5, a fragmentary plan view of one of the special hinges;

Fig. 6, a fragmentary sectional view taken as indicated at line 6—6 of Fig. 5;

Fig. 7, a fragmentary sectional view taken as indicated at line 7—7 of Fig. 5;

Fig. 8, a side elevational view of the machine in transport position;

Fig. 9, an enlarged sectional elevational view showing one of the front supporting wheels and supporting standard mounted on the cross bar;

Fig. 10, a fragmentary sectional view taken as indicated at line 10—10 of Fig. 8; and Fig. 11, a fragmentary sectional view of the spacer bar taken as indicated at line 11—11 of Figs. 3 and 8.

In the embodiment illustrated, a frame 12 has a pair of supporting wheels 13 and a rear cross bar 14. A forwardly extending draw bar 15 is provided at its front end with a tractor coupling member 16 and at its rear end with a hinged supporting bracket 17 to support the draw bar in substantially horizontal position when disconnected from the tractor. It may be swung up into inoperative position when the machine is in operation.

The cross bar 14 is equipped at each end with a double hinge 18 best shown in Figs. 5—7. The hinge has a vertically disposed pintle 19 and a pintle 20 which is inclined about 8° from horizontal as will be explained below. A pair of extensions 21 are connected at one end to the hinge member 18 and their free ends are supported by caster wheels 22 having a vertical pivot 23 journalled in a fixed cantilever arm 24.

When the extensions are turned back into transport position, as viewed in Fig. 3, their free ends are connected by a spacer bar 25 which is clamped to the extensions and is detachably held in position by means of hand bolts 26, as shown in Fig. 11.

Each of the extensions is provided with multiple pairs of standards 27 provided with hooks 28 which are fixed to the extensions by means of U bolts 29 so as to be inclined upwardly and outwardly when in transport position. The rear cross bar 14 of the frame has similar standards 30 provided with rearwardly extending hooks 31 and forwardly extending hooks 32. As best shown in Fig. 2, when the machine is in operative position the draw bar 15 is connected by link bars 33 to detachable clevises 34 provided on each of the extensions 21. When it is desired to transform the machine from the operative position shown in Fig. 2 to the transport position shown in Fig. 3 each clevis is disconnected from the link and the free sections of the links are placed in carrying position in hooks 32.

The spike-tooth harrow sections 35 are of conventional construction and are illustrated schematically. However, they may be provided with the usual hand lever 36 which can be released and swung forwardly to turn the spikes backwardly into inoperative position. Short chains 37 are provided for detachably connecting the harrow sections to brackets 38 that are longitudinally adjustable along extensions 21 to accommodate various widths of conventional spike-tooth harrows.

As the extensions 21 are long and the caster wheels extend forwardly in an operating position, there will be a certain amount of torsional deflection between the pintle 20 and the cantilever arm 24. This torsional deflection is proportional to the load of harrow sections and the strength of the material used to construct the extensions, thus the angle of inclination of pintle 20 is made sufficient to compensate for the maximum deflection expected so that the free end of the extension will remain substantially level and not drag on the ground when loaded with harrow sections. As the machine is drawn over the ground each extension, carried by a caster wheel, is free to conform generally with the ground and the chain connections with each spike-tooth harrow permit the harrow to follow the contour rather closely and produce a good harrow action.

When it is desired to transform the machine into transport position the harrow levers are thrown forwardly and the rear ends of the harrows are lifted upwardly on one edge and hung on the hooks 28 or 31. After the connecting links 33 have been disconnected and supported in the hooks 32 the extensions are swung back into the position shown in Fig. 3 manually or by advancing the tractor a short distance. The spacer bar 25 is then connected and the machine is ready to follow the tractor out of the field and through farm gates.

In the illustration seven spike-tooth harrow sections are shown and the central section can be hung directly on the standards on the rear cross bar. If an even number of harrow sections are used the connecting chains 37 of the two central sections may be disconnected and both sections carried on the hooks 31.

The caster wheel pivots 23 are disposed so that there is a slight amount of camber when the machine is in transport position. When the extensions are turned into working or operating position the removal of the weight of the harrow sections reduces the torque on the extensions and thus tips the pivot bearing forward slightly in the direction of travel so that there is less tendency to "shimmy." The standards 27 are inclined from a vertical position so that when carrying the spike-tooth sections the center of gravity of the sections is over the clamps 29 to reduce the required clamping pressure and also the torsion stress on the extensions in transport position.

The foregoing detailed description is given for clearness of understanding only, and no unnecessary limitations should be understood therefrom, for some modifications will be obvious to those skilled in the art.

I claim:

1. A spike tooth harrow evener, comprising: a frame provided with a draw bar for attachment to a tractor, said frame having a pair of laterally spaced supporting wheels; a cross beam mounted on the rear of said frame; a flanking extension joined to each end of the cross beam, each of said flanking extensions being connected to the cross beam by a double hinge for pivotal movement upwardly and downwardly during a harrowing operation and for pivotal movement rearwardly to turn the extensions from transverse extended position to trailing transport position; connecting means for attaching said extensions to said draw bar; upwardly extending standards on the cross beam and extensions for detachably suspending spike-tooth harrow sections edgewise in transport position; and a supporting caster wheel positioned near the free end of each of the extensions, said two caster wheels and the supporting wheels forming a stable four-wheeled carriage for the harrow evener when the sections are turned to trailing transport position.

2. A spike-tooth harrow evener, comprising: a frame provided with a draw bar for attachment to a tractor, said frame having a pair of laterally spaced supporting wheels; a cross beam mounted on the rear of said frame and having a pair of flanking extensions connected by hinges to said cross beam so that the extensions may be turned from transverse extended position to trailing transport position; connecting means for attaching said extensions to said draw bar; upwardly extending standards on the cross beam and extensions for detachably suspending spike-tooth harrow sections edge-wise in transport position; and a supporting caster wheel positioned near the free end of each of the extensions, each caster wheel being mounted on a fixed cantilever arm extending forwardly when the extensions are in extended position and laterally when the extensions are turned to trailing transport position, the laterally extending cantilever arms in transport position spacing the caster wheels to enhance the stability of the four-wheeled carriage.

3. A spike-tooth harrow evener, comprising: a wheel supported frame provided with a draw bar for attachment to a tractor; a pair of flanking extensions extending outwardly from the frame, each extension having a forwardly projecting cantilever arm secured near its outer end; a supporting caster wheel mounted on each cantilever arm forwardly of each extension; connecting means for attaching said extensions to the draw bar; upwardly extending standards on the extensions for detachably suspending spike-tooth harrow sections edge-wise thereon; and a hinge securing an end of each extension to the frame, each of said hinges adapting each extension for universal movement, each hinge having a first portion pivoted to the frame to permit an extension to be swung from an outwardly extending working position to a trailing transport position, and a second portion pivoted to an end of one of said extensions to permit up and down movement of said one extension in working position, said second hinge portion restricting said up and down movement to a plane extending upwardly and forwardly of a vertical plane passing through the two hinges.

4. A machine as specified in claim 3, in which the first portion of each of the hinges includes a vertically disposed hinge pintle, and the second part of each of the hinges includes a hinge pintle which is canted downwardly and forwardly from the horizontal when the extensions are in working position.

References Cited in the file of this patent

UNITED STATES PATENTS

| 774,319 | Graham | Nov. 8, 1904 |
| 2,597,533 | Rogers | May 20, 1952 |

FOREIGN PATENTS

| 550,539 | Germany | May 18, 1932 |
| 146,078 | Australia | Apr. 16, 1952 |